AUTOMATIC MULTIPLE DIALING APPARATUS

Filed Dec. 21, 1948 6 Sheets-Sheet 1

Inventor
Charles W. Olliver
By [signature]

Inventor
Charles W. Olliver
By [illegible]
Atty.

Inventor
Charles W. Olliver
By [signature]
Atty.

Nov. 27, 1951 C. W. OLLIVER 2,576,189

AUTOMATIC MULTIPLE DIALING APPARATUS

Filed Dec. 21, 1948 6 Sheets-Sheet 4

INVENTOR
Charles Wolfram Olliver,
BY
ATTORNEY

Nov. 27, 1951 C. W. OLLIVER 2,576,189

AUTOMATIC MULTIPLE DIALING APPARATUS

Filed Dec. 21, 1948 6 Sheets-Sheet 5

Inventor
Charles W. Olliver
By [signature]
Atty

Nov. 27, 1951 C. W. OLLIVER 2,576,189

AUTOMATIC MULTIPLE DIALING APPARATUS

Filed Dec. 21, 1948 6 Sheets-Sheet 6

Inventor
Charles W. Olliver
by [signature]
Atty

Patented Nov. 27, 1951

2,576,189

UNITED STATES PATENT OFFICE 2,576,189

AUTOMATIC MULTIPLE DIALING APPARATUS

Charles Wolfran Olliver, Paris, France, assignor to Societe Civile des Brevets O. B., Paris, France Application December 21, 1948, Serial No. 66,411
In France December 22, 1947

3 Claims. (Cl. 179—90)

This invention relates to an automatic multiple dialing device, that is to say to an apparatus for calling automatically one or more telephone numbers.

When one or more telephone numbers are to be called up and some of them are found to be engaged, or do not answer, a prolonged attention of an operator will be required until communication with all the desired numbers is obtained; and when the telephone switchboard or private exchange is operated by a person having also other duties, the numbers with which communication could not be obtained at the first attempt run the risk of being called again at too long intervals, or of not being called again at all, through an oversight.

In any case, the repeated dialing and the awaiting of the answer cause a considerable loss of time which reduces the efficiency of the switchboard, or disturbs the activity of the user of the telephone. Further, hasty dialing is frequently the cause of mistakes.

The apparatus according to this invention serves the purpose of calling automatically and successively, at regular intervals, one or more telephone numbers which have been set up in advance by means of a series of setting members, without further intervening of the caller.

With this object in view, the apparatus according to the invention comprises, for each telephone number to be called, an adjustable dialing device adapted to execute automatically the calling of any desired number, a timing gear adapted to put the said dialing device or devices into action periodically, and an answer signal advising the user when the called number answers.

The apparatus according to the invention generally comprises a plurality of dialing devices, a distributing relay actuated by said timing gear and putting said dialing devices into action successively, in turn, and indicating means designating the dialing device which is in action.

The periods of action of the dialing devices are advantageously separated by intervals during which the telephone line is left free, so that calls coming from the outside can be received.

Each dialing device comprises a mechanically driven telephone impulse sender combined with a series of adjustable travel limiters, the number of which is equal to the number of digits of each telephone number, said travel limiters being adapted to be set for any telephone number to be called.

Each of said travel limiters may comprise a cipher-carrying drum adjustably mounted on the shaft of the telephone impulse sender and carrying an abutment whose encounter with the armature of a relay connected up by the timing gear determines the return of the impulse sender to its starting point.

A current embodiment of the apparatus according to the invention may comprise, for example, three series of seven cipher-carrying drums on which it is possible to set up three complete telephone numbers of seven digits (three letters and four figures), as used in the present French telephone system. It is, however, obvious that the number of drums in each series may be chosen differently, in accordance with any other system. Likewise, it is of course also possible to increase the number of series, and consequently the number of telephone numbers which can be pre-set and called automatically and successively, in turn.

During the time periods in which the calls are made and the answer of the called number is awaited, the timing gear puts into action a line switch which substitutes itself to the receiver-hook switch of the telephone and puts into action the answer signal.

On the other hand, an arresting switch closed by the lifting of the receiver-hook of the telephone causes the interruption of the circuit of the motor driving the timing gear, so as to interrupt the action of the apparatus as long as the call goes through.

The action of this arresting switch is advantageously delayed by a reset switch which is mounted in series with said arresting switch and maintained open by the timing gear during the period in which the call is made and the answer of the called number is awaited.

An embodiment of the apparatus according to the invention will now be described, by way of example, with reference to the accompanying drawings. In this example, the apparatus comprises three series of seven adjustable setting members in the shape of cipher-carrying drums, on which three complete telephone numbers of seven digits each can be set up in advance.

Figure 14:
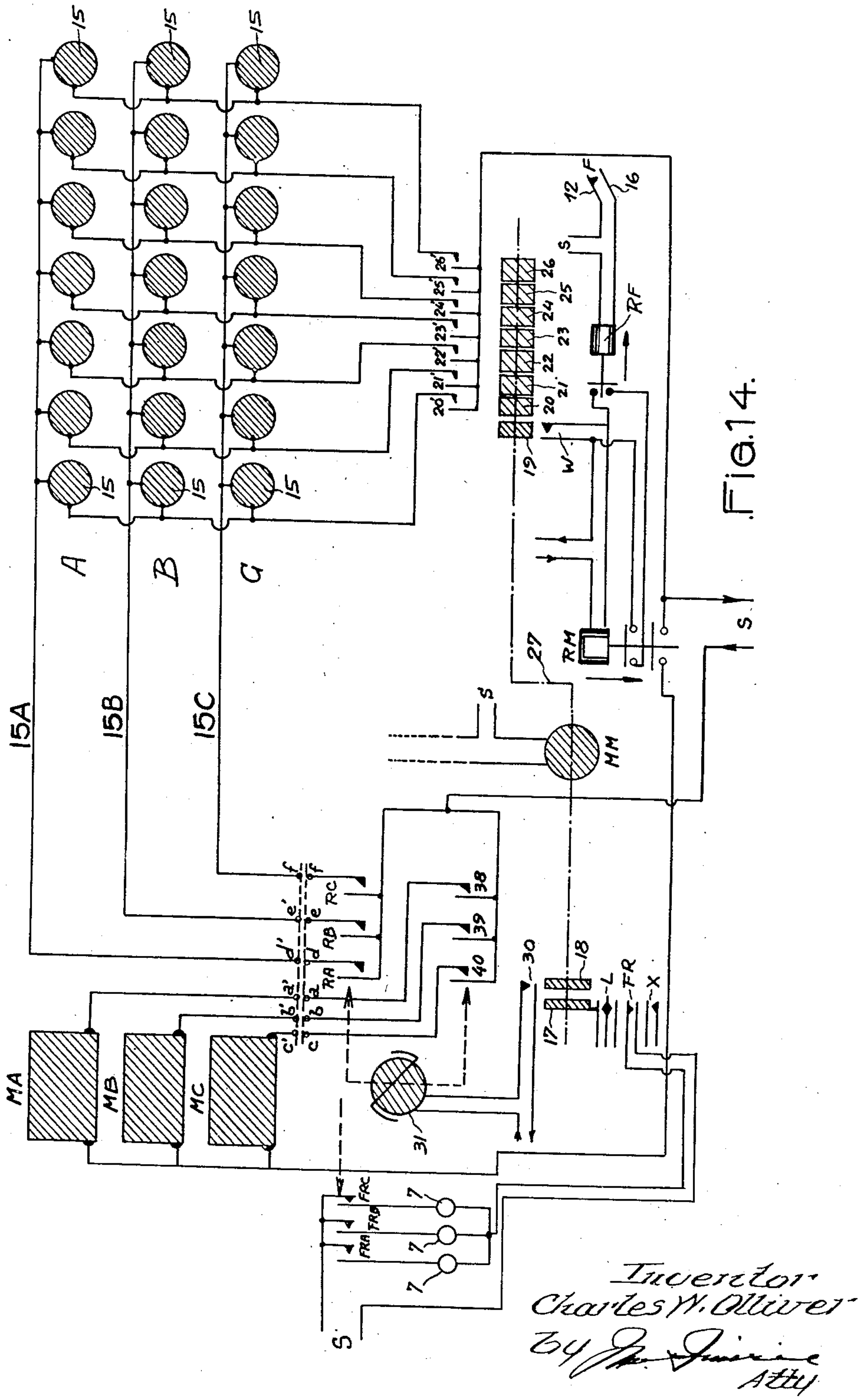
Figure 14A:
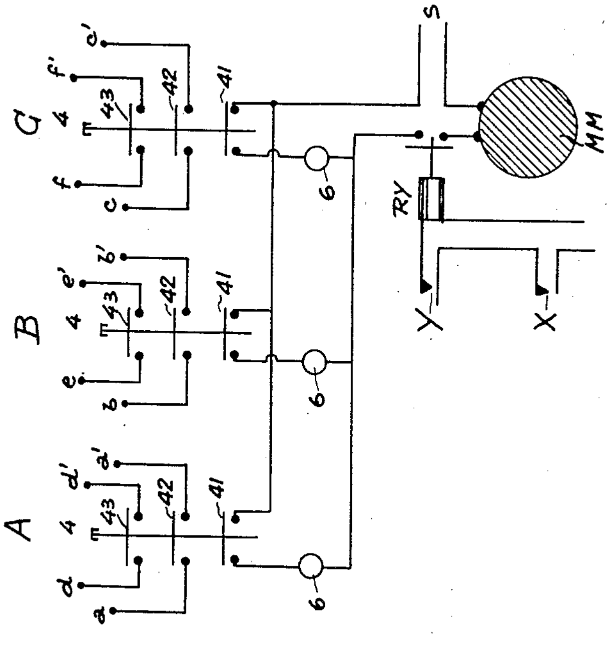

Figs. 14 and 14*a* represent the wiring diagram of the apparatus.

Figure 15:
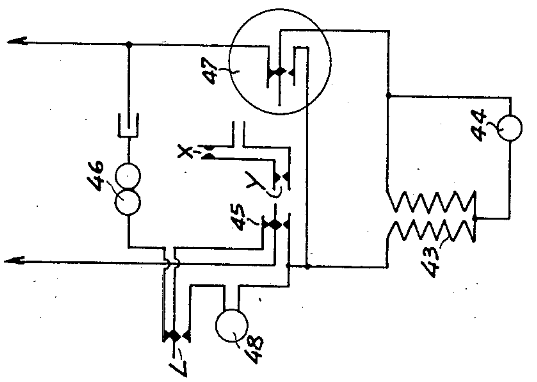

Fig. 15 represents the wiring diagram of an automatic telephone modified in view of its connection with the apparatus according to the invention.

Figure 1:
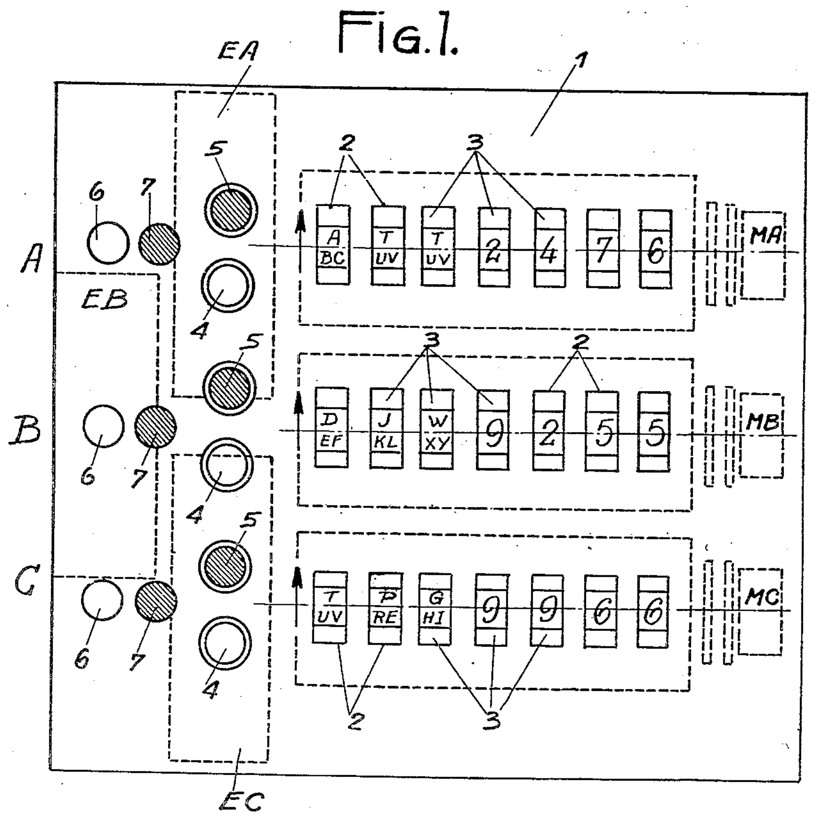
Fig. 1 represents the panel of the apparatus.
Figure 3:
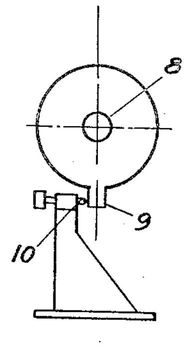
Fig. 3 is an end view of the stop member for the shaft of the series of drums.
Figure 2:
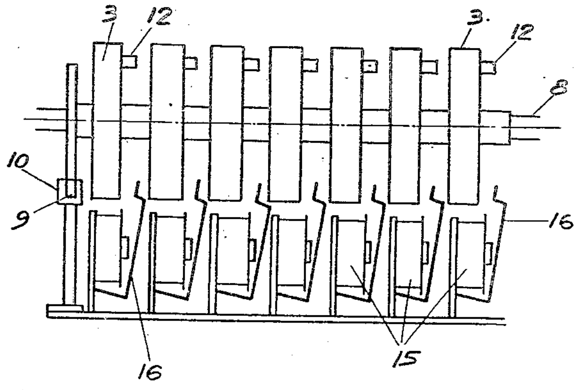
Fig. 2 is a side view of one series of cipher-carrying drums and of the relays cooperating with these drums.
Figure 5:
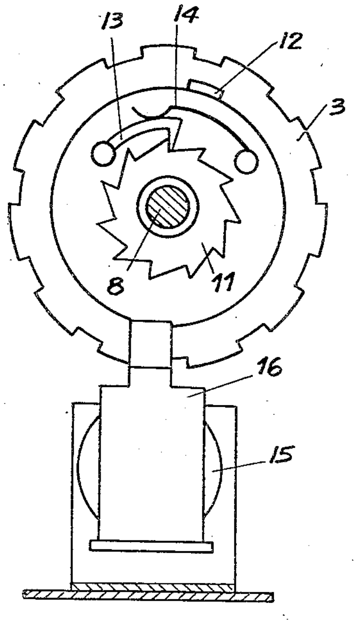
Fig. 5 is a section along line V—V of Fig. 4, viewed in the direction of the arrows.

The panel 1 of the apparatus (Fig. 1) is formed, for each telephone number to be set up respectively in the series A, B and C, with seven apertures 2 behind each of which is rotatably mounted a drum 3 which can be actuated by its periphery, projecting slightly over the surface of the panel 1, so that it can be engaged by a finger of the user. A slight pressure of the finger upon the periphery of a drum 3 is sufficient to turn the same and to bring the desired cipher or letter of each drum into register with the corresponding aperture 2 of the panel 1. The first three drums 3 from the left carry the letters ABC, DEF, GHI, JKL, MN, PRS, TUV, WXY and OQ, and the four other drums 3 carry the figures 1, 2, 3, 4, 5, 6, 7, 8, 9, and 0, the shown embodiment being designed for the present French automatic telephone system, in which each telephone number is composed of seven digits, comprising three letters and four figures.

To each series of drums 3 are associated two push buttons 4 and 5, one green and the other red, for example, and two small signal-lamps 6 and 7, mounted in the panel and, for example, also green and red respectively.

When a telephone number has been set up in the manner described above, depression of the green button 4 corresponding to the series of drums 3 on which the number has been set up starts the operation of the apparatus. The corresponding green signal-lamp 6 lights up simultaneously and indicates that the series is in operation. This green signal lamp 6 will remain alight until the number set up in this series is canceled, as will be described hereafter. If necessary, the two other series are operated in the same manner.

The apparatus first calls the first number which has been set up, the calling of the number lasting 20 seconds. Then, the answer of the called number is awaited during 40 further seconds. If the called number is engaged or if it does not answer, the line is broken for a time interval of one minute, during which calls from the outside can be received in the usual manner. The apparatus then calls the second number which was set up in advance, proceeding in the same manner, then the third, and so on, beginning once more with the first and all over again.

The time interval between the successive calls have been provided so as to avoid a complete blocking of the user's telephone line, which would otherwise remain "engaged" all the time. When the user disposes of more than one line, this time interval may be reduced or even omitted, except for a short interval of security.

Each time one of the series A, B or C of the drums 3 makes a call, the corresponding red signal-lamp 7 lights up and remains alight during the 20 seconds of the call and the 40 seconds of awaiting the answer. If the called number answers, this is announced by an answer signal (bell, buzzer, etc.) and the user, seeing which one of the red signal-lamps 7 is alight, knows immediately which of the previously set up numbers has answered. He lifts the receiver of his telephone, which has the following consequences:

(1) The user is put through to the called number, and (2) The apparatus is stopped, so that its action is suspended as long as the call goes through.

As soon as the receiver is hung up, the apparatus resumes its operation. The user cancels the number which has just been obtained, by depressing the corresponding red button 5, whereby the green signal lamp 6 is switched off, showing that this series has been put out of action and is available for setting up another number, which can then be brought into action by depressing again the green button 4. It is besides possible, at any time, to cancel any one of the set up numbers by depressing the red button 5, and to compose another number, without interrupting the operation of the apparatus.

When the answer signal is perceived while none of the red signal-lamps 7 is alight, the user will know that a call comes from the outside.

The apparatus does not change anything in the normal telephone of the user which remains independent and can be used at any time, since the lifting of the receiver suspends the operation of the apparatus. It is only necessary to avoid lifting the receiver as long as one of the red signal-lamps 7 is alight, except when answering a call. At any other time, one may therefore use the telephone, with the aid of its normal dial.

The following description will at first deal with the construction and operation of one series, which is identical to that of the others, and then with the means for switching over from one series to the following.

Each series comprises seven cipher-carrying drums 3 of light material, which have a diameter of about 3 c. m. and are mounted one behind the other on a common shaft 8. The shaft 8 of each series A, B, C drives a telephone impulse sender EA, EB, EC, respectively, which is identical with the impulse sender of an ordinary telephone dial, the shafts 8 being driven by small electric motors MA, MB, MC, respectively. The shaft 8 is normally at rest, an abutment 9 associated therewith leaning against a fixed stop 10, and a spring (not shown) urges the shaft 8 back towards this position of rest as soon as the corresponding motor is cut out.

Each drum 3 is composed of two parts: an inner part 11 formed with ratchet teeth, fixedly mounted on the shaft 8 and driven thereby, and an outer, angularly adjustable part 3 carrying the ciphers which are visible through the apertures 2 of the panel 1. An abutment 12 projects axially from the peripheral part 3 of the drum.

The parts 11 and 3 of the drum are coupled by a pawl 13 mounted on part 3 and engaging the ratchet teeth of part 11 under the action of a spring 14, this ratchet and pawl coupling having the following purposes:

(1) It allows the angular displacements of the adjustable part 3 with respect to the part 11 fixed on the shaft 8, so that the user can, with his finger, displace the part 3 so as to bring the desired digit thereon into register with the aperture 2 of the panel, whereby the angular position of the corresponding abutment 12 is adjusted with respect to the part 11 fixed on the shaft 8.

(2) It transmits the rotation of the part 11 fixed on shaft 8 driven by the motor, to the adjustable part 3 carrying the abutment 12.

Beneath the seven drums 3 are mounted seven small electromagnetic relays 15, one for each drum, the armatures 16 of these relays projecting into the intervals between each drum 3 and the following one. Normally, when the relays 15 are not energised, the armatures occupy the position shown in full lines in Fig. 4, in which they are out of the path of the abutments 12 carried by the drums 3.

Figure 4:
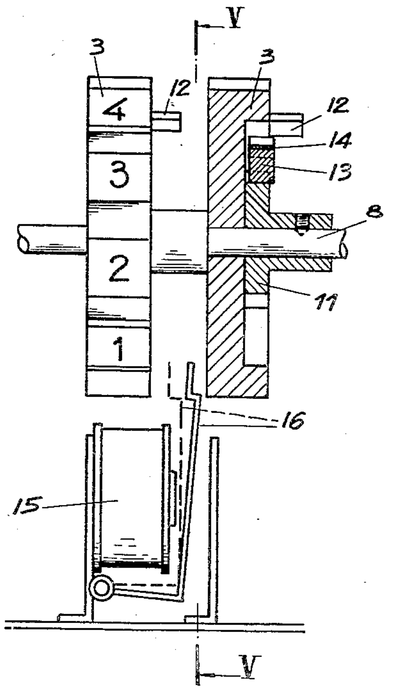
Fig. 4 represents, at a larger scale, two of the cipher-carrying drums, one of which is shown in axial section and the other in elevation, as well as the relay cooperating with the last mentioned drum.
Figure 6:
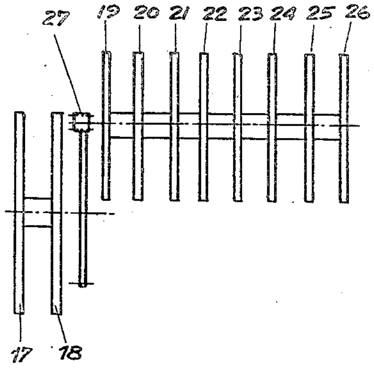
Fig. 6 is a schematic side view of the timing gear.
Figure 7:
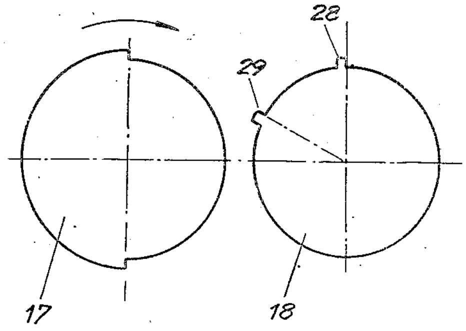
Figs. 7 and 8 are an elevational view and a development of the first and second cam of the timing gear.

When one of the relays 15 is energised, its armature 16 is attracted into the position shown in dotted lines on Fig. 4, so that the abutment 12 of the corresponding drum 3 encounters the said armature 16 and closes a circuit causing the motor driving the shaft 8 to be cut out, thus limiting the angular displacement of the shaft 8 to an angle depending on the angular position of the abutment 12. As soon as the motor driving the shaft 8 is cut out, said shaft is rotated back by the above mentioned spring (not shown), until the abutment 9 comes to rest against the stop 10.

Now, the angular position of the abutment 12 depends itself on the angular position previously given to the adjustable drum part 3 with respect to the part 11 fixed on the shaft 8, and thus on the cipher on drum part 3 brought into register with the window 2 of the panel 1, when setting up the desired telephone number.

It will thus be understood that, for each drum 3, the angular displacement of the shaft 8 is exactly determined by the cipher brought into register with the window 2 of the panel 1. As the angular displacement adjusted by means of each of the drums 3 is successively transmitted by the shaft 8 to the corresponding telephone impulse sender EA, EB or EC respectively, this impulse sender will send the required number of impulsions, during the backward rotation executed by the shaft 8, under the action of its return spring, as soon as the corresponding motor is cut out. The previously set up telephone number will thus be dialed automatically. In this manner, each series of drums 3, 11, with the associated impulse sender and relays 15, constitutes an impulse transmitter wherein the drums with the corresponding relays are impulse controlling devices by which the numbers of impulses sent out by the impulse sender can be adjusted at will.

For each series of drums 3, the operating cycle is controlled by a small timing gear (Figs. 6 to 10) and comprises the following phases:

(1) Energising of the first relay 15.

(2) Starting of the motor which rotates the shaft 8 until the abutment 12 of the first drum 3 encounters the armature 16 of the corresponding first relay 15.

(3) By this encounter, the motor is cut out as it will be explained below, the shaft 8 is rotated back to its position of rest, and the impulse sender EA, EB or EC associated therewith, following the return movement of shaft 8, sends a number of impulsions corresponding to the angular position of the abutment 12. At this time, the first relay 15 is de-energised and its armature 16 resumes its position of rest.

(4) Energising of the second relay 15.

(5) Starting of the motor which rotates the shaft 8 until the abutment 12 of the second drum 3 encounters the armature 18 of the second relay 15.

(6) Same as under (3) above.

The phases of this cycle are repeated successively for each of the seven drums 3 and relays 15.

Figure 11:
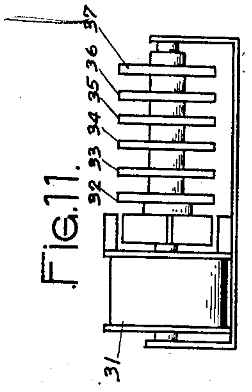
Fig. 11 is an elevational view of the distributing relay.
Figure 13:
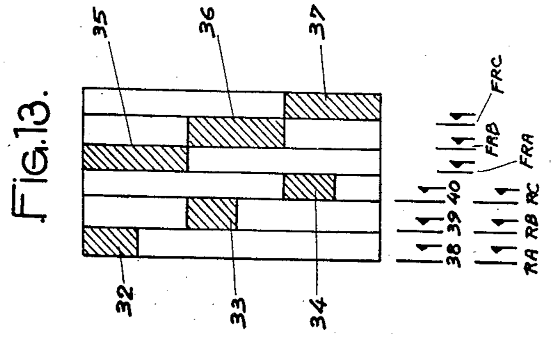
Figs. 12 and 13 are an elevational view and a development of the cams of the distributing relay.
Figure 10:
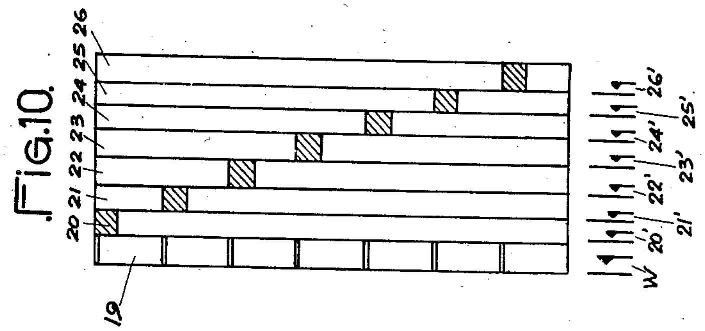
Figs. 9 and 10 are similar views of the other cams of the timing gear.
Figure 8:
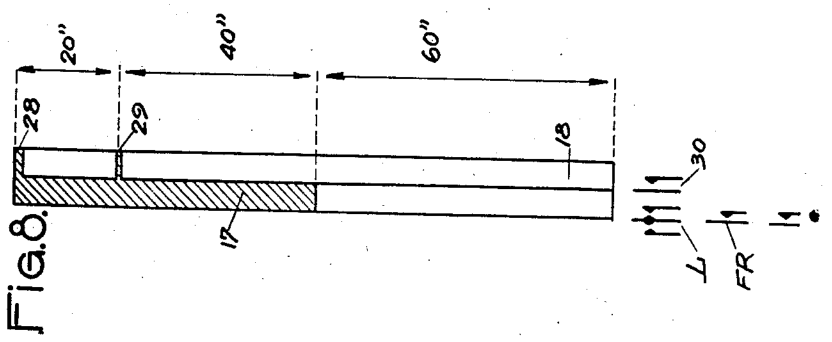
Figure 9:
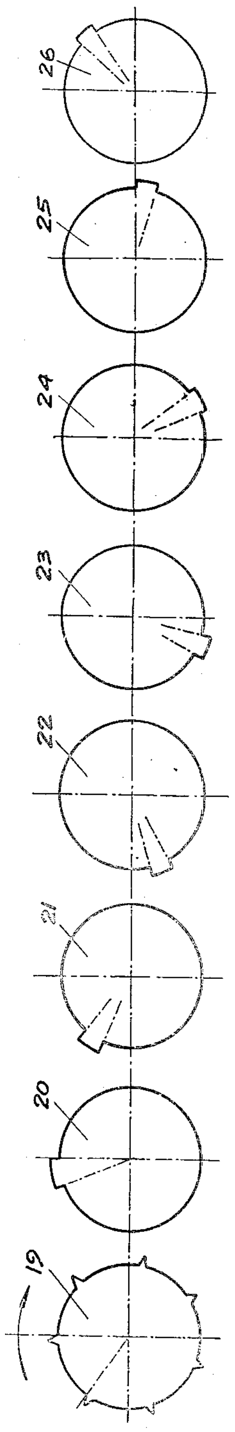
Figure 12:
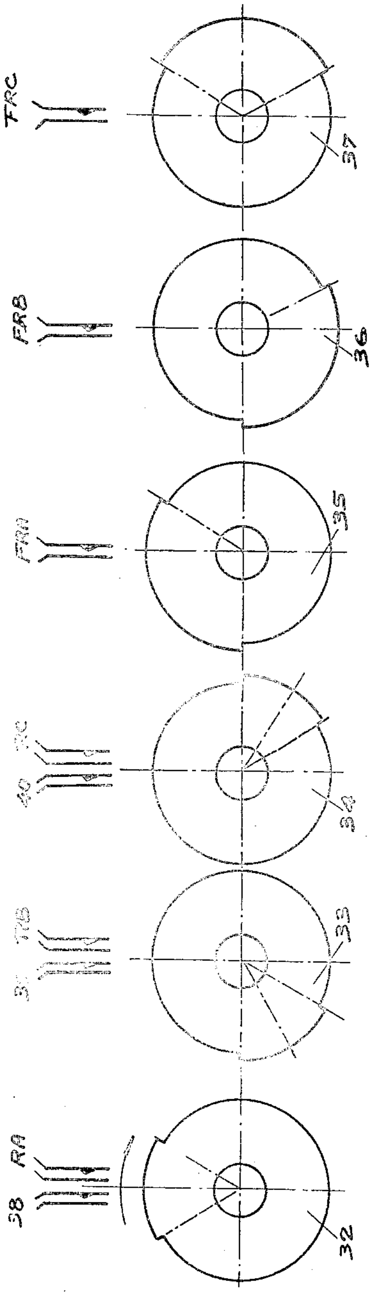

This cycle has a total duration of 20 seconds. At its end, a special distributing relay 31 (Figs. 11 to 13) definitively cuts out the motor of the considered series as well as the circuit of the corresponding relays 15, but the line remains connected during further 40 seconds, in expectance of the answer of the called number. Finally, the timing gear cuts the line, which is left free for 1 minute, during which calls from the outside can be received. The following cycle is executed in the same manner as that described above, but the said distributing relay 31 connects the second series of relays 15, instead of the first series which was previously in operation. After completion of the cycle in the second series, the distributing relay 31 connects the third series, then again the first series, and so forth.

The timing gear (Figs. 6 to 10) comprises two series of cams: A first series of two cams 17, 18, and a second series of eight cams 19 to 26. Said first series of cams makes one turn in two minutes, and said second series of cams makes one turn in 20 seconds. A single motor MM (Figs. 14 and 14*a*) rotates both series of cams between which a drive 27 having a ratio of 1:6 is interposed.

The first cam 17 closes for 60 seconds (20 for the call and 40 of waiting) the line switch L and simultaneously a first contact FR in the circuit of the red signal-lamps 7. During the remaining 60 seconds of one complete turn (2 minutes) of this cam, the line is left free for calls from the outside.

The second cam 18 has two teeth 28, 29 spaced apart at an angle of 60° corresponding to a time interval of 20 seconds, marking the beginning and the end of the 20 seconds during which the calling impulses are made. These teeth 28, 29 close a contact 30 emitting impulses which control the distributing relay 31, as it will be described hereinafter.

The cams 19 to 26 rotate as long as the cams 17 and 18, but their contacts are connected only for the 20 seconds during which the calling impulses are made. This connection is effected by the distributing relay 31. The 20 seconds in question represent a complete turn of the cams 19 to 26.

The cam 19 has seven teeth, each of which closes the contact W and thus gives the impulses necessary for starting, by means of a relay RM, one of the motors MA, MB, MC selected by the distributing relay 31, the circuit of the thus started motor being subsequently cut by the encounter of the abutment 12 with the armature 16 of the corresponding relay 15, as it will now be explained.

The teeth of the cam 19 close the circuit of the relay RM only momentarily, but this relay is provided with holding contacts which are cut out by another relay RF when any one of the abutments 12 encounters the corresponding relay armature 16. The contact established by this encounter is schematically indicated at F in the diagram of Fig. 14.

The seven other cams 20 to 26 close the contacts 20′ to 26′ and thereby close successively, at the proper times, the circuits of the seven relays 15 placed beneath the drums 3 of each series. These circuits constitute the impulse controlling circuits of the impulse controlling devices.

The distributing relay is of the type comprising a rotating armature and a ratchet drive, and is controlled by impulsions. These impulses are emitted by the teeth 28, 29 of the cam 18, at the beginning and at the end of the calling period. Each impulse received by the distributing relay 31 causes an advance of one step of this relay and of its shaft, which carries cams 32 to 37 actuating the contacts. The ratchet drive of the relay having six teeth, the cams 32 to 37 will successively assume six angular positions spaced 60° apart.

Each of the first three cams, 32, 33 and 34, extends over an angle of 60° and acts upon two mechanically coupled contacts, viz:

(1) One of the contacts 38, 39, 40 controlling the energizing circuits of the motors MA, MB, MC driving the shafts 8 of the series A, B, C respectively.

(2) Simultaneously, one of the contacts RA, RB, RC closing the feeders 15A, 15B, 15C of the relays 15 of the series A, B, C, which are connected on the other hand to the contacts 20′ to 26′ controlled by the cams 20 to 26.

The three remaining cams 35, 36, 37 of the relay 31 extend over angles which are double of those of cams 32, 33, 34, that is to say over 120°, and close the contacts FRA, FRB or FRC selecting the red signal-lamp 7 corresponding to the series A, B or C which is to be switched on by the contact FR of cam 17, the switching on of these red lamps 7 being thus limited to a duration of 60 seconds, corresponding to the periods of calling and waiting.

The operation of the distributing relay and its rather complex cycle are illustrated by the following table:

motor for driving all three shafts 8, this motor running as long as the timing gear, which can furthermore also be driven by this same motor. This single motor then drives constantly a series of gears to which the shafts 8 of the series A, B and C are coupled by means of small magnetic clutches which, in the general diagram of Fig. 14, take then the place of the motors MA, MB, MC.

In this case, instead of the motors MA, MB, MC, the above mentioned magnetic clutches are energised and de-energised by the distributing relay 31 and by the relay RM. Such an embodiment has considerable advantages: A single motor is sufficient, instead of four. The clutches being mounted directly on the shafts 8, which are themselves very light, these shafts rotate backwards very freely, without having to take the gears or the motor with them. The strength required for the return springs of the shafts 8 is therefore much smaller, so that a motor of smaller power will be sufficient.

When one of the green buttons 4 is depressed, it remains locked in its depressed position and its contacts remain closed until the corresponding red button 5 is depressed. The action of the buttons 4 is indicated by the diagram of Fig. 14*a* which joins the general diagram of Fig. 14 at the points *a*, *a′*, *b*, *b′*, *c*, *c′*, *d*, *d′*, *e*, *e′*, *f* and *f′*.

The lower contacts 41 of the buttons 4 close the circuit of the green lamp 6 and cause starting of the motor MM of the timing gear, as soon as any one of the buttons 4 is depressed.

The intermediate contacts 42 close, in conjunction with the distributing relay 31, the circuits of the motors (or clutches) MA, MB, MC. When one of the buttons 4 is not depressed, the corresponding series does not operate.

The upper contacts 43 have a similar function as regards the relays 15 of the series A, B and C.

| | Call 20″ | Wait 40″ | Line free 60″ | Call 20″ | Wait 40″ | Line free 60″ | Call 20″ | Wait 40″ | Line free 60″ |
|---|---|---|---|---|---|---|---|---|---|
| Positions | 1 | 2 | | 3 | 4 | | 5 | 6 | |
| Cam 32 | 38 RA | | | | | | | | |
| Cam 33 | | | | 39 RB | | | | | |
| Cam 34 | | | | | | | 40 RC | | |
| Cam 35 | FRA | FRA | | | | | | | |
| Cam 36 | | | | FRB | FRB | | | | |
| Cam 37 | | | | | | | FRC | FRC | |

In this table, the contacts actuated by the distributing relay 31 are indicated in the columns relating to the positions in which said contacts are closed by the respective cams.

38=contact closing circuit of motor MA,
39=contact closing circuit of motor MB,
40=contact closing circuit of motor MC,
RA=contact closing circuit of relays 15 of series A,
RB=contact closing circuit of relays 15 of series B,
RC=contact closing circuit of relays 15 of series C,
FRA=contact closing circuit of red lamp 7 of series A,
FRB=contact closing circuit of red lamp 7 of series B,
FRC=contact closing circuit of red lamp 7 of series C.

For the sake of clearness, the described embodiment comprises three separate motors MA, MB, MC driving the shafts 8 of the series A, B, C. In practice, it is however possible to use only one Finally, the diagram of Fig. 14*a* shows a contact Y which is closed when the telephone hook is lifted, whereby the circuit of the motor MM of the timing gear is cut through a relay RY, so that the operation of the apparatus is interrupted as long as a call goes through.

In the diagrams of Figs. 14 and 14*a*, the references S indicate sources of current.

The diagram of Fig. 15 represents at 43 the receiver, at 44 the microphone, at 45 the hook switch, at 46 the bell and at 47 the impulsion sender of a conventional automatic telephone. 48 is the signal indicating that a called number has answered, and L is the line switch of Fig. 14, which is actuated by the cam 17 of the apparatus according to the invention. This line switch is identical with the hook switch 45 of the conventional telephone, and is connected in such manner that the bell disconnecting gap of switch L is in series with the bell disconnecting gap of switch 45, while the line closing contact of switch L is in parallel with the corresponding contact of switch 45. The result of this connection is that when the line switch L is actuated, it substitutes itself to the hook switch 45 of the telephone, but the answer signal 48 is inserted into the circuit and comes into action as soon as the called number answers, when the circuit is completed by the lifting of the hook at the opposite end of the line, whereby the line switch L is operated. Consequently, the answer signal 48 is shunted, this signal being besides cut out a few moments later, when the switch L is opened by the cam 17.

Fig. 15 also shows the above mentioned contact Y which is closed when the receiver of the telephone is lifted, and causes the cutting out of the motor MM of the timing gear, so as to arrest the apparatus while a call is going through. The action of this contact Y is however delayed by another contact X (Figs. 14, 14*a* and 15) which is mounted in series with the contact Y and opened by the cam 17, and is closed only when said cam 17 has reset the switch L into its position of rest.

The apparatus according to the invention is of small size, approximately 15 by 14 by 10 cm. It is also useful in cases where the same telephone numbers are to be called very frequently. These numbers may be set up on the apparatus in advance, whereafter a pressure upon one of the green buttons will be sufficient to have the desired number called.

When the person to be called up disposes of several lines, three of them may be set up on the apparatus which has been described above, and may be called in turn, until communication with one of them is obtained.

The mechanism of the apparatus according to the invention is extremely simple and practically fool-proof. Its operation is easy and errors in the called numbers are practically excluded.

For anyone having a simple telephone in his office, the apparatus according to the invention offers the facilities of an operator who is always at his service. For a switchboard operator, it constitutes a precious aid which greatly facilitates the work and considerably increases the output.

It will be understood that the invention is not limited to the embodiment which has been described with references to the accompanying drawings, and that other embodiments of the invention are possible within the scope of the appended claims.

I claim:

1. An apparatus for calling automatically at least one telephone number by emitting groups of impulses, each group corresponding to a digit of the telephone number to be called, comprising in combination a plurality of impulse controlling circuits, one for each digit of the telephone numbers to be called; an impulse control switch in each of said impulse controlling circuits; a plurality of impulse transmitters comprising each an energizing circuit, an energizing switch in said energizing circuit, a rotatable shaft, a telephone impulse sender mounted on said shaft, driving means energized by said energizing circuit for rotating said shaft in one direction, resilient means urging said shaft in the opposite direction to a position of rest and a manually adjustable impulse controlling device associated with each of said impulse controlling circuits, each of said manually adjustable impulse controlling devices comprising a cipher carrying drum mounted on said shaft so as to be manually angularly adjustable with respect to said telephone impulse sender, an abutment on said drum, an impulse controlling relay energized by one of said impulse controlling circuits, an armature on said relay, said armature occupying when said impulse controlling relay is de-energized a position outside the path of said abutment and being shifted into said path when said impulse controlling relay is energized, an interrupting circuit including said abutment and said armature, and an energizing relay in said energizing circuit and operatively connected to said interrupting circuit for interrupting said energizing circuit when said interrupting circuit is closed by the engagement of said abutment with said armature; a timing gear comprising a distributing relay operatively engaging said energizing switches so that said energizing circuits are closed successively, in turn, when said distributing relay is operated, an operating circuit for said distributing relay, an operating switch in said operating circuit, cam means operatively engaging said operating switch for operating said distributing relay periodically, and other cam means operatively engaging said impulse control switches for closing said impulse controlling circuits successively after each operation of said distributing relay; a line switch controlled by said timing gear for closing the telephone line during operation of any of said impulse transmitters; and an answer signal mounted in series with said line switch and responsive to the answer of a called number.

2. An apparatus for calling automatically at least one telephone number by emitting groups of impulses, each group corresponding to a digit of the telephone number to be called, comprising in combination a plurality of impulse controlling circuits, one for each digit of the telephone numbers to be called; an impulse control switch in each of said impulse controlling circuits; a plurality of impulse transmitters including each an energizing circuit, an energizing switch in said energizing circuit and a manually adjustable impulse controlling device associated with each of said impulse controlling circuits; a timing gear comprising a distributing relay operatively engaging said energizing switches so that said energizing circuits are closed successively, in turn, when said distributing relay is operated, an operating circuit for said distributing relay, an operating switch in said operating circuit, cam means operatively engaging said operating switch for operating said distributing relay periodically, and other cam means operatively engaging said impulse control switches for closing said impulse controlling circuits successively after each operation of said distributing relay; a line switch controlled by said timing gear for closing the telephone line during operation of any of said impulse transmitters; an answer signal mounted in series with said line switch and responsive to the answer of a called number; an arresting switch connected to the receiver-hook of the telephone so as to be closed by the lifting of said receiver-hook; and means operable by the closure of said arresting switch for interrupting the circuit of the motor driving said timing gear.

3. An apparatus for calling automatically at least one telephone number by emitting groups of impulses, each group corresponding to a digit of the telephone number to be called, comprising in combination a plurality of impulse controlling circuits, one for each digit of the telephone numbers to be called; an impulse control switch in each of said impulse controlling circuits; a plurality of impulse transmitters including each an energizing circuit, an energizing switch in said energizing circuit and a manually adjustable impulse controlling device associated with each of said impulse controlling circuits; a timing gear comprising a distributing relay operatively engaging said energizing switches so that said energizing circuits are closed successively, in turn, when said distributing relay is operated, an operating circuit for said distributing relay, an operating switch in said operating circuit, cam means operatively engaging said operating switch for operating said distributing relay periodically, and other cam means operatively engaging said impulse control switches for closing said impulse controlling circuits successively after each operation of said distributing relay; a line switch controlled by said timing gear for closing the telephone line during operation of any of said impulse transmitters; an answer signal mounted in series with said line switch and responsive to the answer of a called number; an arresting switch connected to the receiver-hook of the telephone so as to be closed by the lifting of said receiver-hook; means operable by the closure of said arresting switch for interrupting the circuit of the motor driving said timing gear; a reset switch mounted in series with said arresting switch and means in said timing gear for holding said reset switch open until said timing gear resumes its position of rest.

CHARLES WOLFRAN OLLIVER.

REFERENCES CITED

The following references are of record in the file of this patent:

UNITED STATES PATENTS

| Number | Name | Date |
|---|---|---|
| 1,237,234 | Beach | Aug. 14, 1917 |
| 1,725,134 | Gardner | Aug. 20, 1929 |
| 1,752,211 | Szwajkart | Mar. 25, 1930 |
| 2,134,626 | Shipton | Oct. 25, 1938 |
| 2,199,443 | Ott | May 7, 1940 |
| 2,434,959 | Richard | Jan. 27, 1948 |

FOREIGN PATENTS

| Number | Country | Date |
|---|---|---|
| 397,456 | Great Britain | 1933 |